April 24, 1934.   P. P. GEARHART ET AL   1,956,347
WRINGER ROLLER
Filed Sept. 21, 1929
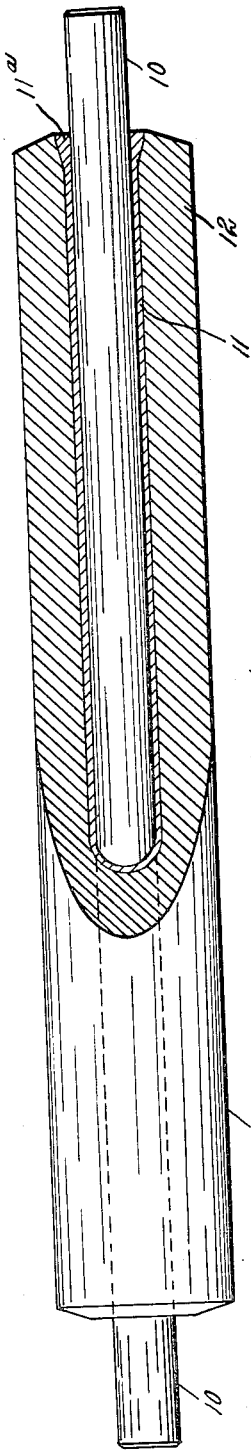
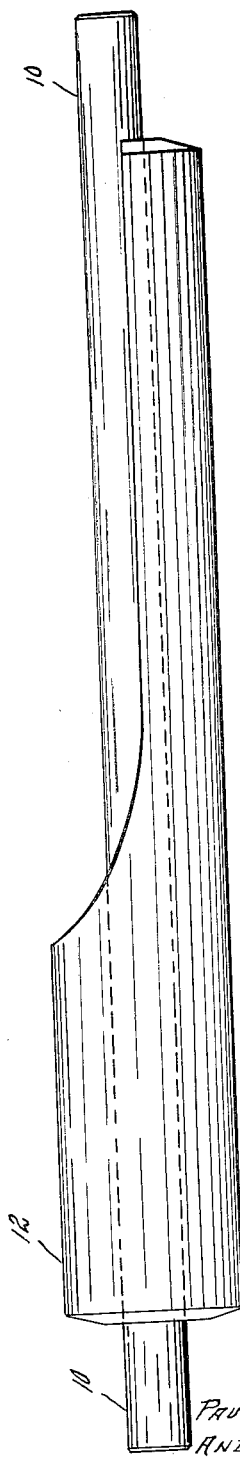
INVENTOR.
PAUL P. GEARHART,
ANDREW B. MULLIN.
BY
ATTORNEYS.

Patented Apr. 24, 1934

1,956,347

UNITED STATES PATENT OFFICE 1,956,347

WRINGER ROLLER

Paul P. Gearhart and Andrew B. Mullin, Akron, Ohio, assignors to The Firestone Tire & Rubber Company, Akron, Ohio, a corporation of Ohio Application September 21, 1929, Serial No. 394,355

1 Claim. (Cl. 68—33)

This invention relates to rubber covered wringer rollers and to an improved method for producing them.

Heretofore, wringer rollers have been made by vulcanization of the rubber body of the roller to a central shaft, but difficulty has been encountered in securing the desired adhesion between the rubber and the shaft. The rollers have been formed by wrapping rubber for the body of the roll about the shaft, which process has several undesirable features including the insecure joining of the rubber at the seam and a more or less dirty seam on the finished roller.

It is an object of this invention to overcome the above mentioned disadvantages of the prior art by provision of a new method of making wringer rollers.

Another object is to devise a method of making wringer rolls wherein a body of resilient rubber is bonded to a shaft by means of a semi-hard rubber base, the latter being semi-cured to produce the desired shape for the base and to eliminate the formation of air bubbles between the base and the body of resilient rubber applied thereover.

More particularly, an object of the invention is to provide a wringer roller having a seamless rubber body effectively bonded to the shaft and being of uniform resilience about its periphery.

A further object is to provide such a roller in which the use of metallic bushings or washers is obviated.

The invention is illustrated in the accompanying drawing and further described below, it being understood that it is not limited to the specific form shown and described.

Of the accompanying drawing,

Figure 1 is a plan view of a wringer embodying the invention, a portion being cut away to more clearly show the construction thereof.

Figure 2 is a side view of Figure 1.

The wringer roller as shown in the drawing comprises a shaft 10 having a semi-hard rubber bonding layer or base 11 and a soft resilient rubber body 12 vulcanized thereon. The ends of the semi-hard rubber base 11 are preferably enlarged or flanged as at 11$^a$ to assist in holding the shape of the ends of the roller and to provide hard non-metallic wear resisting ends on the rollers as a substitute for metallic washers or bushings.

In the manufacture of rollers, the shaft 10 is preferably roughened in some manner such as by sand blasting, and pickled as by a suitable agent such as copper sulphate. A sheet of semi-hard rubber which has been calendered to suitable thickness is then folded or wrapped around the axle. The unit is now placed in a mold and the rubber 11 is semi-cured onto the axle 10 in substantially the form shown in Figure 1. After removing the unit from the mold, the rubber base 11 is buffed or ground both to assist in the bond between the tread portion and the base, and to true up the vulcanizable base portion.

A tube of soft rubber is made to provide the body of the roller as by die-expressing in tubular shape so that the tube will be seamless. This tube is slipped onto shaft 10 over the base 11 by the aid of compressed air forced into an end thereof, which end is drawn over the shaft much in the same way that inner tubes are drawn onto mandrels. The assembled wringer roll is then cured in a suitable mold, this cure not only curing the tread 12 to provide the tough, resilient body of the roll but also completing the curing of the base 11 and bonding the body to the base. The roller is preferably vulcanized so as to be slightly oversized and after removing the roller from the second mold, it is ground true and to the desired diameter.

The invention provides a greatly improved, seamless non-corroding wringer roll, and it will be apparent that various modifications can be resorted to without departing from the spirit of the invention or the scope of the appended claim.

What is claimed is:

As a new article of manufacture a wringer roller including a shaft having a rubber base and a rubber body vulcanized thereon, said base comprising a comparatively hard rubber sleeve provided with integral, outwardly tapering, enlarged ends and said body comprising a resilient seamless rubber tube integrally vulcanized to said base and co-extensive with the base and having inwardly extending bevelled ends overlying the tapered enlargements, whereby to permit axial elongation of the ends of the body during use without interference of said ends with the supporting structure for the roller.

PAUL P. GEARHART.
ANDREW B. MULLIN.